June 29, 1926.

H. A. HERNDON ET AL 1,590,745

TRUCK BOLSTER

Filed Nov. 20, 1925    2 Sheets-Sheet 1

Witnesses:
Wayne Hudson
John E. Titus

Inventors:
Henry A. Herndon and
Frederick H. Riester.
By Rummler & Rummler
Atty's:

June 29, 1926.

H. A. HERNDON ET AL 1,590,745

TRUCK BOLSTER

Filed Nov. 20, 1925

Witnesses:
Wayne Hudson
John E. Titus

Inventors:
Henry A. Herndon.
and Frederick H. Biester.
By Rummler & Rummler
Atty's:

Patented June 29, 1926.

1,590,745

UNITED STATES PATENT OFFICE.

HENRY A. HERNDON AND FREDERICK H. RIESTER, OF CHICAGO, ILLINOIS, ASSIGNORS TO THE BRADFORD CORPORATION, OF CHICAGO, ILLINOIS, A CORPORATION OF DELAWARE.

TRUCK BOLSTER.

Application filed November 20, 1925. Serial No. 70,305.

This invention relates to car truck bolsters, and more particularly to the end reinforcement therefor, and is chiefly characterized by providing an interlocked structure in which either one of the side plates may be independently removed.

In car construction the body bolster rests on the center of the truck bolster, and the ends of the truck bolster are engaged in slots in the truck side frames, and supported on the car springs which seat in the side frames. As a result there is considerable wear of the end reinforcing structures of the truck bolsters.

The main objects of this invention are to provide an end reinforcing structure which is formed by interlocking joints to save labor in construction; and to provide a structure in which a worn plate may be removed without removing the entire structure.

An illustrative embodiment of the invention is shown in the accompanying drawings, in which.

Figure 1:
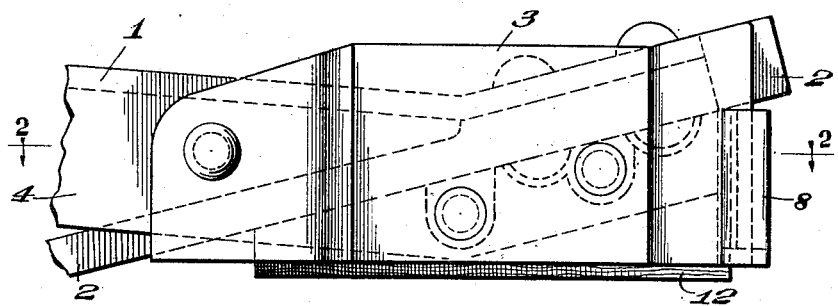
Fig. 1 shows one end of the truck bolster.
Figure 2:
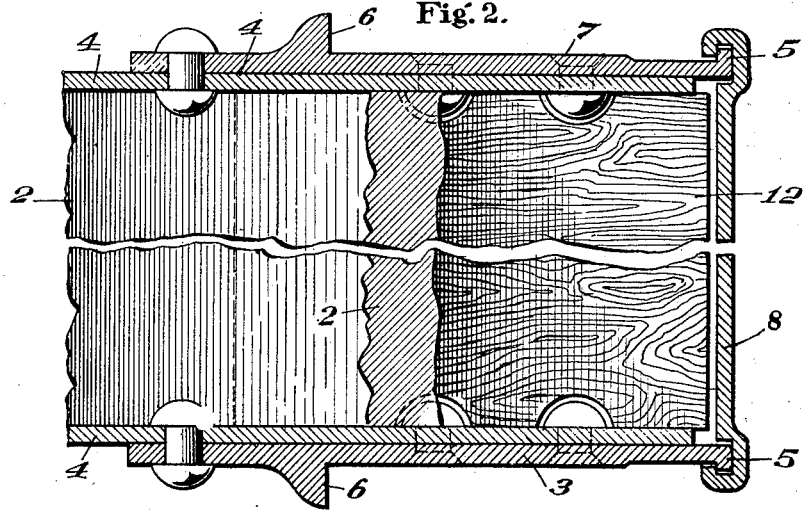
Fig. 2 is a section substantially on the line 2—2 of Fig. 1.
Figure 3:
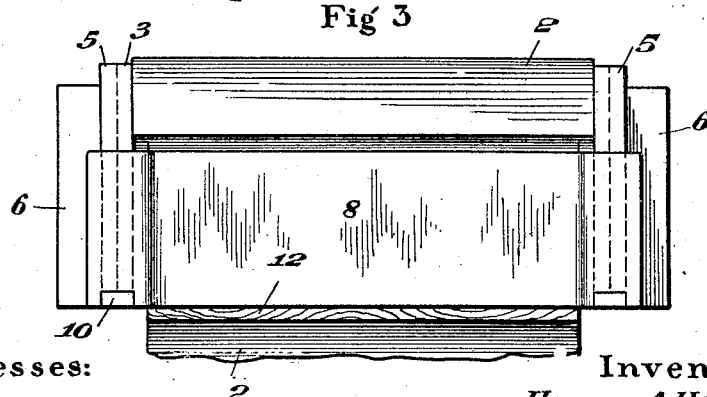
Fig. 3 is an end elevation of Fig. 1.
Figure 4:
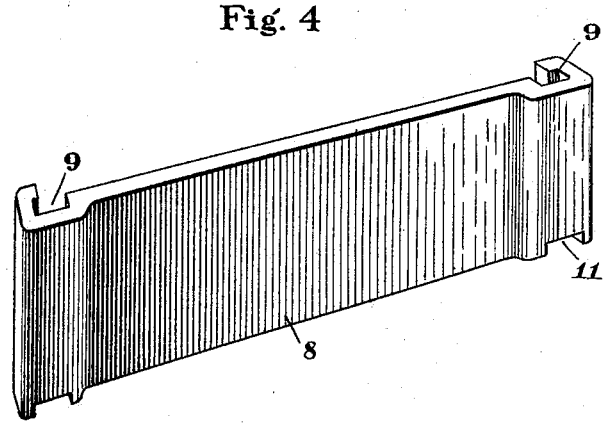
Fig. 4 is a perspective view of the end plate member.
Figure 5:
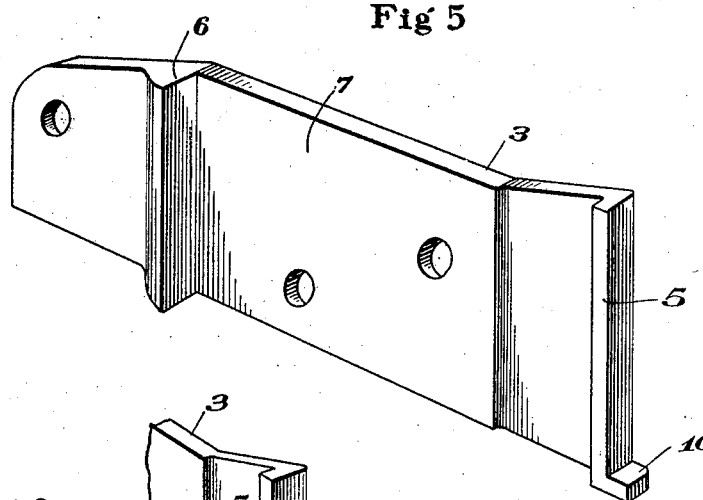
Fig. 5 is a view of one of the side plates.
Figure 6:
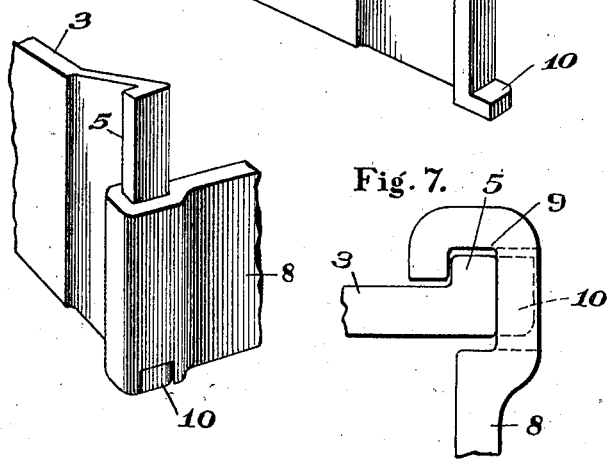
Fig. 6 shows the corner assembly of the reinforcement.
Figure 7:
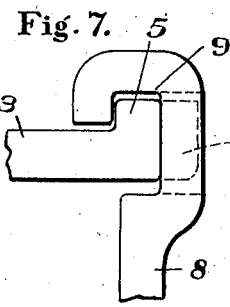
Fig. 7 is an enlarged plan view of the interlocking joint.

In the drawings is illustrated a truss frame truck bolster having an inverted channel upper member 1, the ends of which are inclined upwardly and joined to the outer ends of the inversely bowed lower member 2.

The side plates 3 are riveted to the side flanges 4 of the member 1 and are provided at the outer ends with locking flanges 5. The side members are made of a quality of material suitable to withstand the severe shocks and wear, and are provided with shoulders 6 for limiting the side movement of the bolster relative to the truck frames, and a thickened wearing portion 7. The end plate 8 may be cast or otherwise made of a softer grade of material, and is provided with the end grooves 9, which are adapted to the flanges 5 to form an interlocking joint. At the lower corners of the side plates is formed a projection or stop 10, which engages in a notch 11 in the lower edge of the end plate and forms a support for the same. The interlocked structure formed by the two side plates and the end plate, when secured in place in the form of truck bolsters shown, also provides a recess or enclosure for the upper spring block 12. The end plate by being locked around the flanges 5 prevents spreading, and is held from moving upwardly by the outer portion of the end of the lower truss member 2, which overlies the end plate 8.

In constructing the car, the reinforcement is quickly assembled in place by inserting the flanges 5 in the grooves 9 and securing the complete unit in place by riveting the side plates. In service the wear is always greater on one plate than on the other, and in case one of the plates is broken, there is no necessity for replacing the entire reinforcement as has been required heretofore. In this invention one plate may be removed by cutting the rivets, and then the plate is unlocked from the end plate 8 by swinging the plate 3 or by simply dropping the plate downward. The plate on the other side and the end plate remain attached to the truck bolster frame, and the new plate may be inserted by interlocking the end into the groove 9 in the end plate 8 and riveting the new plate to the side flange 4.

In this construction the usual variations in the width between the outer ends of the side plates is compensated for by providing clearance in the grooves 9, so that no special fitting is required for the different bolster frames. Another advantage is that, in the present invention, the end plate, which is used for the marks of identification for the bolster, is not ordinarily separated from the bolster during replacement and the identification of the bolster lost.

Although but one specific embodiment of this invention has been herein shown and described, it will be understood that numerous details of the construction shown may be altered or omitted without departing from the spirit of this invention.

We claim:

1. In combination in a truck bolster, an end reinforcement secured to the bolster comprising two side plates and an end plate connected by interlocking joints for independent removal of either one of said side plates.

2. In combination in a truck bolster, an end reinforcement comprising column wear plates riveted to the sides of the frame, and an end plate secured to the ends of the side plates by interlocking joints.

3. In combination in a truck bolster, an end reinforcement comprising side plates having flanged outer ends, and an end plate having grooves adapted for said flanges to form interlocking joints.

4. In combination in a truck bolster, a frame having upwardly inclined ends, an end reinforcement and spring block enclosure comprising side plates each having a flanged outer end and a stop integral therewith, and an end plate having grooved ends for interlocking with said flanged ends and supported by said stops, the side plates being riveted to the frame and the end plate being positioned underneath the outer portion of the end of the frame to prevent the end plate from moving upwardly.

Signed at Chicago this 18th day of November 1925.

H. A. HERNDON.
FREDERICK H. RIESTER.